Oct. 11, 1960    W. MÜLLER ET AL    2,955,393
METHOD AND DEVICE FOR FILLING CONTAINERS WITH ARTICLES, SUCH
AS TABLETS, AND CLOSING THE CONTAINERS
Filed June 29, 1959    3 Sheets-Sheet 1

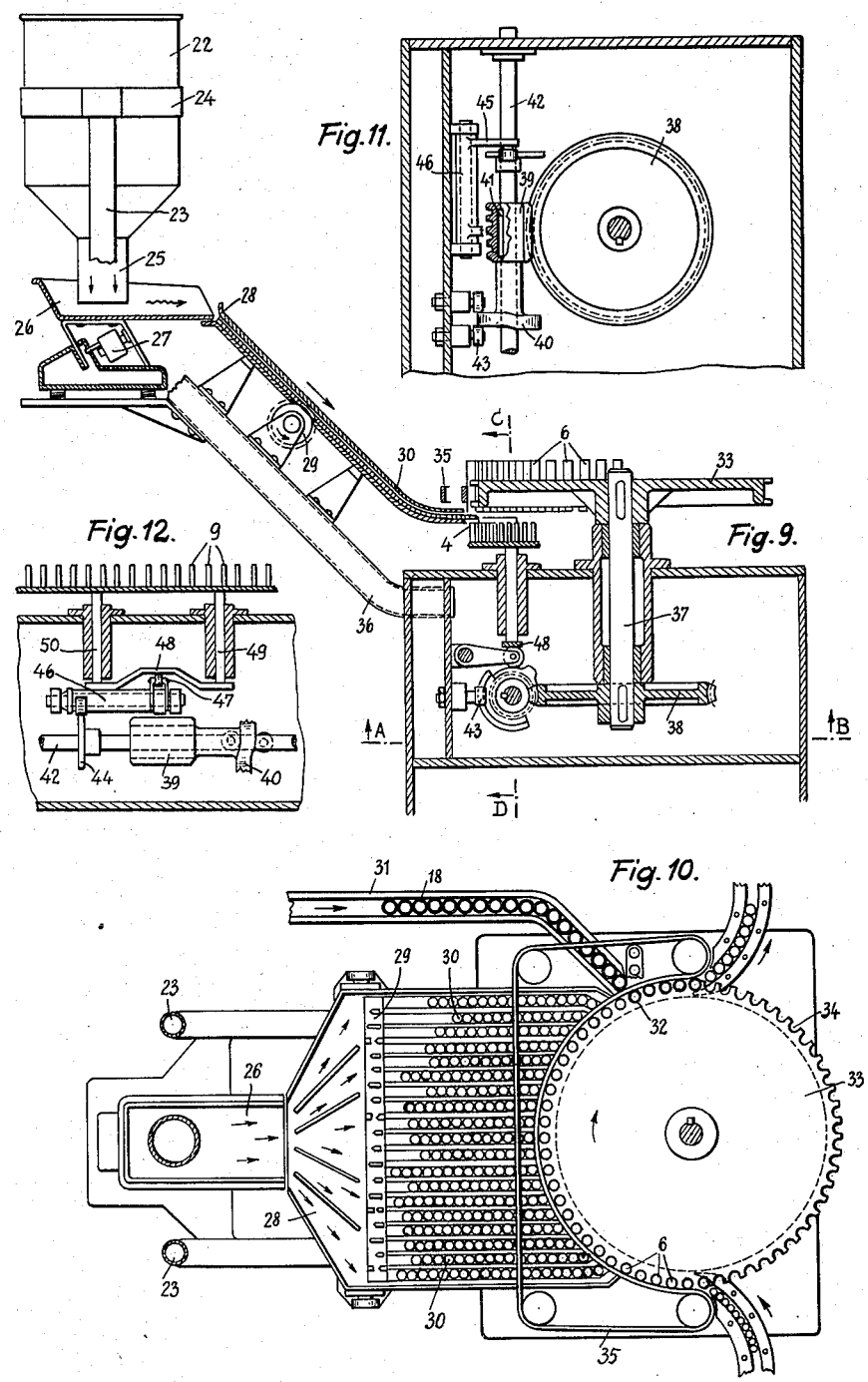

United States Patent Office 2,955,393
Patented Oct. 11, 1960

2,955,393

METHOD AND DEVICE FOR FILLING CONTAINERS WITH ARTICLES, SUCH AS TABLETS, AND CLOSING THE CONTAINERS

Wolfgang Müller, Frankfurt am Main Hochst, and Wilhelm Johann Schmidt, Kelkheim (Taunus), Hornau, Germany, assignors to Wilhelm Fette, Prazisionzwerkzeugfabrik, Schwarzenbek, Germany, a firm Filed June 29, 1959, Ser. No. 823,457

Claims priority, application Germany July 1, 1958

6 Claims. (Cl. 53—37)

The invention relates to a method and device for filling containers with articles, such as tablets, and then closing the containers.

It is an object of the invention to insert tablets in the form of a stack into a tubular container and then closing the container.

In accordance with the invention an endless row of uniformly spaced vertically positioned tubular containers with their open ends facing downwardly is horizontally moved along the stationary horizontal portion of a base which latter is provided with uniformly spaced feed grooves for the articles, such as tablets, to be inserted into the containers. The ends of the grooves from recessed terminal stations for the tablets and are adapted to come into alinement or registration with the open ends of the containers supported by said base plate, whereupon a row of vertically arranged plungers is moved upwardly through the base to push the articles at said recessed terminal stations into said containers. When the containers are filled with a predetermined number of superimposed articles the open end of the containers is closed by a stopper or other closure member by means of a plunger which pushes the stopper into the container in similar manner the articles have been inserted into the container, except that the stopper is securely attached to the open end of the container.

The invention will now be described in more detail by way of example in the following description with reference to the accompanying drawings, in which.

Figure 7:
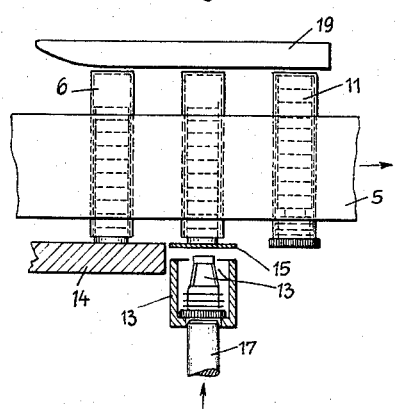
Fig. 7 illustrates a portion of the container closure method, and is a sectional view of the device substantially along the section line K—L of Fig. 6.
Figure 8:
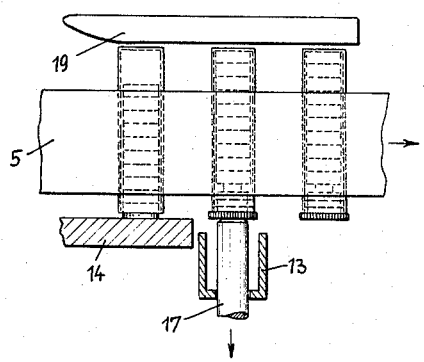

Fig. 8 illutrates in similar manner as Fig. 7 another portion of the container closure method;

Fig. 9 illustrates a longitudinal sectional view of the entire device;

Fig. 10 is a top plan view of the device shown in Fig. 9;

Fig. 11 illustrates a sectional view along the line E—F of Fig. 9, and

Fig. 12 illustrates a sectional view along the line G—H of Fig. 9.

Figure 4:
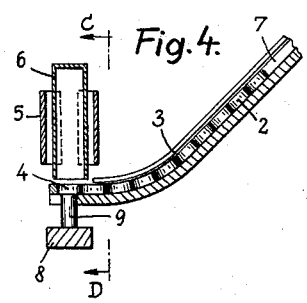
Fig. 4 is a sectional view along the line A—B of Fig. 1.

Referring now to the drawings and particularly to Figs. 1 to 4 inclusive, the device of the invention is provided with a base plate 1 having a plurality of parallel grooves 7 arranged in predetermined uniform spaced relationship. These grooves are of a size corresponding to the size of the tablets which are caused to move along these grooves by their gravity. As shown in Fig. 4, the base plate 1 is arranged in an inclined position and terminates in a lower horizontal portion so that the lowermost tablet in each groove will assume a horizontal position and is prevented from dropping out of its groove by an endwall 1a. The upper ends of the grooves 7 are supplied in any desired manner with tablets which rest with their flat faces on the bottom of the grooves so that the tablets on account of their own weight will constantly slide downwardly and push the tablet in front of the same into the terminal station 4 at the lower end of the grooves. The grooves are covered by suitably shaped cover strips 3.

Whenever a tablet is removed from the terminal station 4, the space vacated will be immediately occupied by the next following tablet which slides downwardly into the mentioned terminal station 4.

Above the lower horizontal portion of the base plate 1 is arranged a conveyor device consisting for instance of two parallel vertically positioned and transversely spaced conveyor bands 5. The faces of the bands which are directed toward each other are provided with prismatic grooves 5a for receiving therein an endless row of vertically arranged tablet receiving tubular containers 6. The lower ends of these vertical containers 6 are open and are slightly spaced from the top surface of the base plate 1 and are moved in and out of registration with the several terminal stations 4 of the tablet feeding grooves 7.

The distance between the prismatic grooves 5a on the two conveyor bands 5 is equal to the distance between the terminal stations 4 of the tablet feeding grooves 7 so that the containers 6 which are held and conveyed by the conveyor device are maintained in exactly the same distance from each other at which the grooves 7 are spaced from each other.

The conveyor bands 5 are driven step by step by a mechanism of known construction and the result is that each container 6 at a certain predetermined time will be positioned in registration with one of the terminal stations 4 and will be moved step by step so as to come into registration with all of the following terminal stations.

Figure 1:
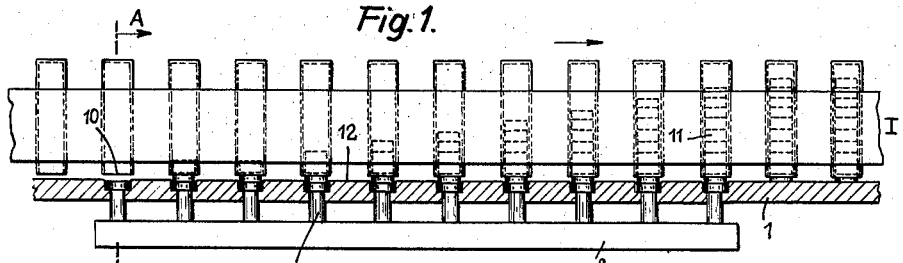
Fig. 1 illustrates diagrammatically a side elevation view of the device, partly in section along the line C—D of Fig. 4.

Fig. 1 illustrates one position of the containers 6 with reference to the terminal stations 4 in the base plate 1.

Below base plate 1 is arranged a row of spaced plungers 9 mounted on a rail 8 which is adapted to be moved upwardly and downwardly. There is provided one plunger 9 for each terminal station 4 and each plunger is arranged in registration with the vertical axis passing through the terminal station 4 and the container 6 which is arranged above the terminal station 4.

The horizontally extending rail is caused to move by means of a well known device in such a manner that the stroke of the plungers 9 in vertical direction is substantially as great as the thickness of a tablet. Therefore, the tablets 2 which are positioned horizontally at the terminal stations 4 are pushed by the plungers 9 upwardly into the tubular containers 6 maintaining in readiness for such filling above the terminal stations 4. The plungers 9 are moved sufficiently far upwardly until the upper ends of the plungers 9 are practically positioned in the upper plane 12 of the plate 1.

With the exception of the first station at 10 which shows a tubular container in registration with the first terminal station 4, one tablet is pushed into the containers positioned over all of the following stations whenever the row of plungers is moved upwardly. It will be noted that a tablet is also pushed into all those containers 6 which previously received a tablet by a previous movement of the plungers 9 so that finally there will be positioned in each container a vertical stack 11 of tablets. All tablets in each vertical stack on account of their gravity remain in their horizontal flat position one upon the other within the containers 6.

Figure 2:
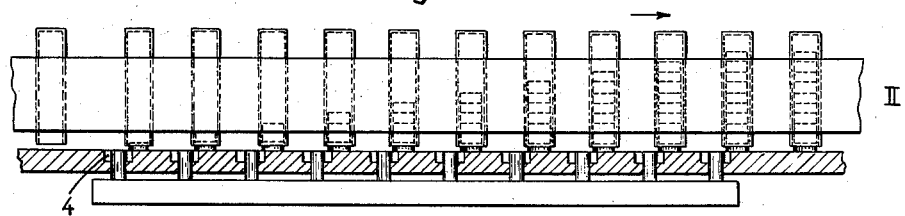
Fig. 2 illustrates the same view as Fig. 1, except that the containers which are filled with tablets and other parts of the device are shown in a different position.
Figure 3:
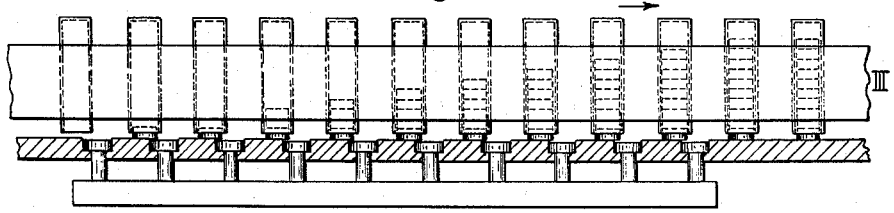
Fig. 3 illustrates the same view as Fig. 1, in which certain parts are shown in still another position.

During the time the plungers 9 are still in their raised positions the entire row of containers 6 is moved by the mentioned conveyor device horizontally one step toward the right. The upper face 12 of the stationary base plate 1 forms a slide surface together with the upper end faces of the plungers 9 along which the lowermost tablet 2 in each container 6 slides toward the next terminal station 4. Of course, the lowest tablet 2 has above it a stack of tablets 11 by the time the container 6 reaches the right hand end of the plate 1 as shown in Fig. 2.

At the time the stack 11 of tablets 2 leaves the plunger 9 the lowermost tablet slides along the plate 1 and thereupon the rail 8 with the plungers 9 thereon is moved downwardly into its starting position. When this happens, all of the terminal stations 4 at the end of the grooves 7 are vacated and the next tablets 2 slide into the vacated terminal stations 4. The tablets 2 which have reached in this manner the terminal stations 4 are positioned flush with the upper face of the plate 1 and form in this manner another continuous surface for the advancing stack 11 of tablets 2 which now in the end phase of a filling step moves into registration with the next terminal station 4. In this manner each stack 11 of tablets 2 will grow larger during each step about the size of one tablet 2. During the next following method step the plungers 9 are again moved upwardly into the upper position and the lowermost tablets resting upon the upper end faces of the plungers 9 are now moved into the containers 6 and thereupon the conveyor device moves again the entire row of tubular containers 6 a distance of one step in horizontal direction.

The above method steps are repeated for each container 6 on each terminal station 4 and the number of terminal stations 4 determines the number of tablets which is filled into each one of the tubular containers 6.

During this operation the tablets 2 are not able to tilt, but they remain always in a flat horizontal position even when the containers 6 are moved horizontally from one terminal station to the next one. Furthermore, the vertical stroke necessary to push one tablet into the container 6 is very short because the size of the stroke necessary need only be about the thickness of a tablet. It is, however, also feasible to modify the device in such a manner that more than one tablet at the same time is pushed into the containers 6. At any rate, the operation is very dependable and the capacity of the filling device is very satisfactory.

Figure 5:
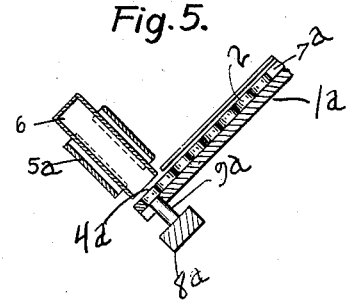
Fig. 5 shows a view similar to Fig. 4, except that the tablet feeding device has a modified construction.

Fig. 5 illustrates a somewhat modified embodiment of the container filling arrangement of the device, in which the base plate 1a is straight and arranged at a predetermined inclination to a horizontal plane to permit a smooth downward sliding movement of the rows of tablets 2 in the grooves 7a toward the lowermost terminal stations 4a. The tubular containers 6 and the two conveyor bands 5a are arranged to move at right angles to the plane of the base plate 1a and also the plungers 9a on the common rail 8a are arranged to move in an inclined plane forming a right angle with the inclined plane of the straight base plate 1a.

Figure 6:
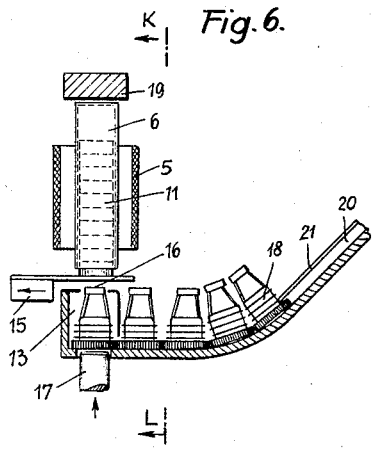
Fig. 6 is a side elevation view partly in section along the line C—D of Fig. 4 of that part of the device which supplies the closure members, stoppers or covers, for the filled container.

The conveyor device 5 moves the filled containers 6 with their open ends facing downwardly in a horizontal direction step by step from left to right until they are caused to rest with their open ends above a terminal station 13 where a stopper or closure member 18 is applied as shown in the Figs. 6, 7 and 8.

The stoppers 18 are fed toward the open ends of the filled containers 6 by means of a feed channel 20 which is arranged at an inclination and terminates in a horizontal portion directly below the containers 6 to be closed. The feed channel 20 is provided with marginal guide rails 21 which retain the stoppers in the channel 20. The stoppers 18 slide on account of their gravity downwardly in the feed channel 20 until they reach the terminal station 13 directly below one of the vertical containers 6. Above the terminal station 13 of the channel 20 is arranged a horizontally slidable plate 15 which retains the tablet stack 11 in the container 6 as shown in Fig. 7. Below the terminal station 13 is arranged a plunger 17 in axial alinement with the container 6 and the foremost stopper 18. This plunger 17, by means of a mechanism not illustrated, is moved upwardly and downwardly. At the beginning of the closure step the foremost stopper 18 is pushed by the upwardly moving plunger 17 into the container 6 and is pressed thereinto. The stack of tablets 11 is maintained in position by the horizontally slidable plate 15 until the top face 16 of the stopper 18 has approached the slidable plate 15 so closely that the latter may be moved horizontally away from the container 6 so that the stack 11 of tablets 2 is immediately engaged by the upper face 16 of the stopper 18 and then is pushed by the latter into the container 6. When the stopper 18 is pressed into the lower open end of the container 6, the required counter-pressure is supplied by a stationary rail 19 arranged above the upper closed end of the container 6.

During the continuous movement of the conveyor device 5 the closed container 6 is moved horizontally toward the right and the same time the next open container 6 is moved into closure position from the left. However, before the new container 6 reaches the terminal or closure station 13 the slidable plate 15 is moved in horizontal direction in order to support the stack 11 of tablets 2 when the latter leaves the supporting plate 14.

Owing to the correctly timed rearward movement of the slidable plate 15 and the simultaneous upward movement of the stopper 18 it is possible for all practical purposes to support the stack 11 of tablets 2 always by a suitable supporting surface.

The Figs. 9, 10, 11 and 12 illustrate by way of example a preferred embodiment of the container filling and closure device of the invention. Obviously, the device may be constructed also in different manner without changing the scope of the invention as claimed in the claims appended to this description.

Fig. 9 discloses a particularly suitable embodiment of a device for the feed and distribution of tablets which are supplied in irregular bulk. A supply container 22 is supported by brackets 23 extending downwardly from a mounting ring 24. This container 22 contains a large quantity of tablets in bulk. The tablets pass continuously through a downwardly extending funnel-type outlet 25 in a controlled stream and drop into a substantially horizontally mounted trough 26 which in a manner known per se, is vibrated by an electrical oscillating magnet 27 so that the tablets slide in an aligned position, namely in a flat position, onto a downwardly inclined distributing tray 28.

Fig. 10 shows that the distributor tray 28 at its upper end has the width of the vibrating trough 26 but becomes gradually wider toward its lower end and delivers the tablets to a distributor roller 29 provided with irregular projections. The distributor roller 29 is driven by a built-in electric motor in counter clockwise direction and serves as a loosening member and causes the flat positioned tablets to slide into the individual feed grooves 30 which in similar manner as the distributor roller 29 is supported by carrier pipes 36. Fig. 10 also discloses that stoppers or closure members 18 are fed in similar manner as the tablets to a separate track 31 by a not illustrated vibrating sorting device. These closure members 18 slide in a downward direction toward a stopper inserting station 32.

According to the Figs. 9 and 10 the terminal stations 4 for the tablets and for the stoppers 18 are arranged along a circular path and above this path, as shown in Fig. 9, is arranged a cellular wheel 33 which rotates about a vertical axis. The wheel 33 is provided on its circumference with recesses 34 and the distance between each two of the recesses 34 corresponds to the distance between the terminal stations 4 and, of course, also corresponds to the distance between the vertical tubular containers moving along the circular path as shown in Fig. 10. The containers 6 are urged and held by means of a vertically positioned belt 35 moving horizontally into the recesses 34 of the wheel 33 and in this manner are supported in a vertical position when the containers 6 are moved along a portion of the circular path and are filled during this movement with tablets.

In a similar manner as described in connection with the Figs. 1 to 4, the containers 6 are supplied with tablets at the individual terminal stations 4. The required step by step rotative movement of the cellular wheel 33 is transferred to it by a vertical shaft 37 at the upper end of which the wheel 33 is mounted. At the lower end of this shaft 37 is mounted a worm gear 38 which is driven by a worm 39 as shown in Fig. 11.

The worm 39 has rigidly attached thereto a drum-like cam 40 and is slidably attached to a driven shaft 42 by means of a key 41. In view of the key connection the cam 40 and the worm 39 are adapted to move axially along the shaft 42. The cam 40 is provided with two similar cam tracks which extend parallel to one another, and is mounted between two rollers 43 mounted on stationary axle stubs as shown in Fig. 11 so that during each rotation of the shaft 42 the worm 39 is moved axially back and forth according to a predetermined design of the cam, but in doing this the worm 39 remains always in engagement with the worm gear 38 which latter performs a normal uniform rotative movement. Owing to the relative movement of the worm 39 with reference to the worm gear 38, however, the customary uniform advacing movement which corresponds to the pitch angle of worm, at certain times is made zero so that in this manner a step by step movement of the cellular wheel 33 is obtained.

The driven shaft 42 has also attached thereto a cam disc 44 the circumference of which is engaged by a roller mounted on a lever arm 45 as shown in Fig. 11. The back and forth swinging movement transmitted to the lever arm 45 takes place in a predetermined relation to the movement of the cellular wheel 33 and is transferred by means of a sleeve-like hub 46 of the lever arm 45 and a second lever arm and also by means of a joint 47 as shown in Fig. 12, to a cross bar 48 which actuates the vertical slide rods 49 and 50 to move the row of plungers 9 in vertical direction each time the cellular wheel 33 comes to a stop. In this manner the tablets are pushed by the plungers 9 into the tubular containers 6. The stoppers 18 are moved in similar manner into the lower ends of the filled containers 6 at the station 32.

What we claim is:

1. In a method of filling containers with articles, such as tablets, in which an endless row of uniformly spaced vertical containers with their open ends directed downwardly is horizontally moved along a stationary horizontal path provided with a row of terminal stations spaced the same distance apart as said vertical containers, feeding articles to said terminal stations, pushing said articles in said terminal stations upwardy into said containers as soon as the open ends of said containers come into registration with said articles at said terminal stations, continuing the horizontal movement of said row of said containers when filled with articles toward another terminal station, feeding closure members for said containers toward said last mentioned terminal station and pushing the closure member at said terminal station into engagement with the open end of said filled container as soon as the latter has been moved into registration with said closure member at said terminal station.

2. In a method of filling containers with articles, such as tablets, in which an endless row of uniformly spaced vertical containers with their open ends directed downwardly is horizontally moved step by step along a stationary horizontal path provided with a row of terminal stations spaced the same distance apart as said vertical containers, feeding articles to said terminal stations, pushing said articles in said terminal stations upwardly into said containers as soon as the open ends of said containers come into registration with said articles at said terminal stations, continuing the horizontal step by step movement of said row of said containers when filled with articles toward another terminal station, feeding closure members for said containers toward said last mentioned terminal station and pushing the closure member at said terminal station into engagement with the open end of said filled container as soon as the latter has been moved into registration with said closure member at said terminal station.

3. In a device for filling tubular containers with a stack of articles, such as tablets, a stationary base plate provided with a series of uniformly spaced recesses each adapted to receive an article to be inserted in said containers, feed grooves for said articles in said base plate and terminating at said recesses, conveyor means for moving an endless row of vertically disposed tubular containers with their open ends facing downwardly and slightly spaced from said base plate along said base plate, said tubular containers being horizontally spaced from each other the same distance said recesses are spaced from each other, plunger means arranged below said base plate and extending into said recesses, and means for moving said plunger means upwardly and downwardly, said plunger means being moved upwardly to push the articles into said tubular containers when the latter during their movement by said conveyor means come into axial alinement with said recesses in said base plate.

4. In a device for filling tubular containers with a stack of articles, such as tablets, a stationary base plate provided with a series of uniformly spaced recesses each adapted to receive an article to be inserted in said containers, feed grooves for said articles in said base plate and terminating at said recesses, conveyor means for moving an endless row of vertically disposed tubular containers with their open ends facing downwardly and slightly spaced from said base plate along said base plate, said tubular containers being horizontally spaced from each other the same distance said recesses are spaced from each other, plunger means arranged below said base plate and extending into said recesses, means for moving said plunger means upwardly and downwardly, said plunger means being moved upwardly to push the articles into said tubular containers when the latter during their movement by said conveyor means come into axial alinement with said recesses in said base plate, a closure member applying means arranged in the path of movement of said filled container and including a terminal station, means for supplying said terminal station with closure members, a plunger for applying said closure member to the lower open end of said filled container when the latter has been moved into axial alinement of said last mentioned terminal station, and abutment means engaging the upper closed end of said container when said closure member is applied to the lower end of the container.

5. In a device for filling tubular containers with a stack of articles, such as tablets, a stationary base plate provided with a series of uniformly spaced recesses each adapted to receive an article to be inserted in said containers, feed grooves for said articles in said base plate and terminating at said recesses, conveyor means for moving an endless row of vertically disposed tubular containers with their open ends facing downwardly and slightly spaced from said base plate step by step along said base plate, said tubular containers being horizontally spaced from each other the same distance said recesses are spaced from each other, plunger means arranged below said base plate and extending into said recesses, means for moving said plunger means upwardly and downwardly, said plunger means being moved upwardly to push the articles into said tubular containers when the latter during their step by step movement by said conveyor means come to rest and into axial alinement with said recesses in said base plate, a closure member applying means arranged in the path of movement of said filled container and including a terminal station, means for supplying said terminal station with closure members, a plunger for applying said closure member to the lower open end of said filled container when the latter has been moved into axial alinement of said last mentioned terminal station, and abutment means engaging the upper closed end of said container when said closure member is applied to the lower end of the container.

6. A device as claimed in claim 3, in which said plunger means has an upper end face which in the raised position of the plunger means is flush with the upper face of that portion of said stationary base plate provided with said recesses.

References Cited in the file of this patent

UNITED STATES PATENTS

| 1,098,061 | Spiller | May 26, 1914 |
| 2,556,214 | Pottle | June 12, 1951 |